United States Patent
Bi et al.

(10) Patent No.: US 11,449,957 B2
(45) Date of Patent: Sep. 20, 2022

(54) METHOD, APPARATUS, DEVICE AND SYSTEM FOR PROCESSING COMMODITY TRANSACTION, AND STORAGE MEDIUM

(71) Applicant: Zhuhai Biyao Industrial Technology Co., Ltd., Guangdong (CN)

(72) Inventors: Sheng Bi, Guangdong (CN); Chengqing Wang, Guangdong (CN); Yanliang Wang, Guangdong (CN)

(73) Assignee: Zhuhai Biyao Industrial Technology Co., Ltd., Zhuhai (CN)

( * ) Notice: Subject to any disclaimer, the term of this patent is extended or adjusted under 35 U.S.C. 154(b) by 0 days.

(21) Appl. No.: 16/880,473

(22) Filed: May 21, 2020

(65) Prior Publication Data

US 2020/0372587 A1    Nov. 26, 2020

(30) Foreign Application Priority Data

May 22, 2019   (CN) .......................... 201910430735.0

(51) Int. Cl.
| | |
|---|---|
| *G06Q 10/06* | (2012.01) |
| *G06Q 50/04* | (2012.01) |
| *G06Q 10/08* | (2012.01) |
| *G06Q 30/06* | (2012.01) |
| *H04L 67/55* | (2022.01) |

(52) U.S. Cl.
CPC ..... *G06Q 50/04* (2013.01); *G06Q 10/063114* (2013.01); *G06Q 10/0833* (2013.01); *G06Q 30/0635* (2013.01); *H04L 67/55* (2022.05)

(58) Field of Classification Search
CPC .......... G06Q 50/04; G06Q 10/063114; G06Q 10/0833; G06Q 30/0635; H04L 67/26
See application file for complete search history.

(56) References Cited

U.S. PATENT DOCUMENTS

| | | | |
|---|---|---|---|
| 2002/0046127 A1* | 4/2002 | Reding ................. | G06Q 40/06 705/37 |
| 2013/0138529 A1* | 5/2013 | Hou ...................... | G06Q 10/08 705/26.5 |
| 2015/0052024 A1 | 2/2015 | Apsley et al. | |

(Continued)

FOREIGN PATENT DOCUMENTS

| | | | |
|---|---|---|---|
| CN | 106447447 A | * 2/2017 | |
| EP | 1978475 A1 | * 10/2008 | ........... G06Q 10/087 |

OTHER PUBLICATIONS

Ben et al "Commodity Liquidity Measurement and Transaction Costs", Aug. 2011, The Review of Financial Studies / v 25 n 2, pp. 599-638 (Year: 2012).*

(Continued)

*Primary Examiner* — Romain Jeanty
(74) *Attorney, Agent, or Firm* — Meunier Carlin & Curfman LLC

(57) ABSTRACT

Disclosed are a method, apparatus, device and system for processing commodity transaction, and a storage medium. The method includes: acquiring a commodity order of a user from an E-commerce platform; generating a manufacturing order according to the commodity order, and providing the manufacturing order to a manufacturer to enable the manufacturer to produce a commodity on the basis of the manufacturing order; and providing a production progress and/or a delivery progress of the commodity to a user.

10 Claims, 3 Drawing Sheets

---

Acquire a commodity order of a user from an E-commerce platform — S110

Generate a manufacturing order according to the commodity order, and provide the manufacturing order to a manufacturer to enable the manufacturer to produce a commodity on the basis of the manufacturing order — S120

Provide at least one of a production progress or a delivery progress of the commodity to the user — S130

(56) References Cited

U.S. PATENT DOCUMENTS

| | | | |
|---|---|---|---|
| 2015/0058067 A1* | 2/2015 | Yuen | G06Q 10/087 |
| | | | 705/7.25 |
| 2015/0197064 A1 | 7/2015 | Walker et al. | |
| 2015/0281365 A1* | 10/2015 | Pham | G05B 15/02 |
| | | | 709/208 |
| 2015/0363850 A1* | 12/2015 | Wang | G06Q 30/0633 |
| | | | 705/26.4 |
| 2015/0379599 A1 | 12/2015 | Bodell et al. | |
| 2016/0342912 A1* | 11/2016 | Kothari | G06F 30/33 |

OTHER PUBLICATIONS

European Search Report, Application No. 20175923.0-1213 dated Oct. 9, 2020.
Chinese First Office Action (translated), Jul. 2, 2020.
Design and Implementation of PCB Custom Service Platform Based on C2M Pattern, Beijing Jiaotong University (2017) (English Abstract included).
Research and Implementation of Garment Customization Platform Based on C2M Model, Xi'an Polytechnic University (2017)(English Abstract included).

* cited by examiner

METHOD, APPARATUS, DEVICE AND SYSTEM FOR PROCESSING COMMODITY TRANSACTION, AND STORAGE MEDIUM

CROSS-REFERENCE TO RELATED APPLICATIONS

This application claims priority to Chinese patent application No. CN201910430735.0 filed with CNIPA on May 22, 2019, the content of which is incorporated herein by reference in its entirety.

TECHNICAL FIELD

The present disclosure relates to E-commerce technologies, and particularly, to a method, apparatus, device and system for processing commodity transaction, and a storage medium.

BACKGROUND

An electronic commerce platform (called as E-commerce platform for short) is a platform that provides online transaction negotiation for corporations or individuals. The E-commerce platform shows, advertises and sells commodities through the Internet.

At present, in the commodity transaction mode of the E-commerce platform, a manufacturer entering the E-commerce platform needs to store a large number of commodities in a warehouse in advance, a user selects and orders a commodity and place an order through the E-commerce platform, and then the manufacturer delivers the corresponding commodity from the warehouse storing the commodities according to the order.

In this transaction mode, commodities is highly priced in consideration of brand premium, as well as inventory, profits, logistics and other multiple intermediate links of distributors at all levels; and moreover, the user cannot know information such as production progress, which significantly decreases satisfaction on user requirements and information acquisition, and affects user experience.

SUMMARY

The present disclosure provides a method, apparatus, device, system for processing commodity transaction, and a storage medium, so as to enhance satisfaction on user requirements and information acquisition, improving user experience.

In a first aspect, an embodiment of the present disclosure provides a method for processing commodity transaction. The method includes steps described below.

A commodity order of a user is acquired from an E-commerce platform.

A manufacturing order is generated according to the commodity order, and provided to a manufacturer to enable the manufacturer to produce a commodity on the basis of the manufacturing order.

A production progress and/or a delivery progress of the commodity are provided to the user.

In a second aspect, an embodiment of the present disclosure provides an apparatus for processing commodity transaction. The apparatus includes an acquisition module, a production module and a provision module.

The acquisition module is configured to acquire a commodity order of a user from an E-commerce platform.

The production module is configured to generate a manufacturing order according to the commodity order, and provide the manufacturing order to a manufacturer to enable the manufacturer to produce a commodity on the basis of the manufacturing order.

The provision module is configured to provide a production progress and/or a delivery progress of the commodity to the user.

In a third aspect, an embodiment of the present disclosure further provides an electronic device. The electronic device includes one or more processors and a memory configured to store one or more programs.

When executed by the one or more processors, the one or more programs cause the one or more processors to implement the method for processing commodity transaction provided in any embodiment.

In a fourth aspect, an embodiment of the present disclosure provides a system for processing commodity transaction. The system includes a management subsystem and a message server, where the management subsystem includes an order unit, a production and delivery unit, and a sending unit.

The management subsystem is configured to use the order unit to acquire a commodity order of a user from an E-commerce platform; use the production and delivery unit to generate a manufacturing order according to the commodity order and provide the manufacturing order to a manufacturer to enable the manufacturer to produce a commodity on the basis of the manufacturing order; and use the sending unit to send a message including a production progress and/or a delivery progress of the commodity to the message server.

The message server is configured to push the message to a terminal of the user.

In a fifth aspect, an embodiment of the present disclosure provides a computer-readable storage medium configured to store computer programs. When executed by a processor, the programs implement the method for processing commodity transaction provided in any embodiment.

DETAILED DESCRIPTION

Figure 1:
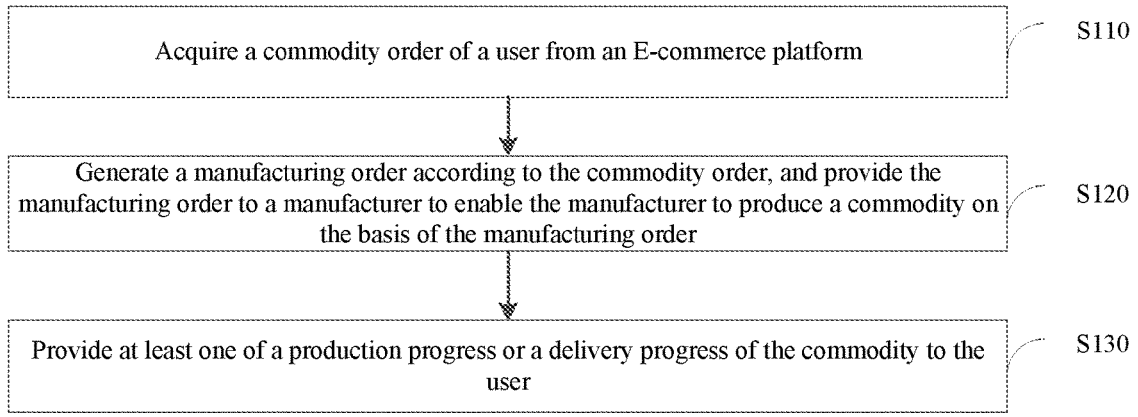
FIG. 1 is a flowchart of a method for processing commodity transaction according to embodiment one of the present disclosure.

Hereinafter the present disclosure will be further described in detail in conjunction with the drawings and embodiments. It is to be understood that the specific embodiments set forth below are intended to illustrate and not to limit the present disclosure. Additionally, it is to be noted that, for ease of description, only part, not all, of the structures related to the present disclosure are illustrated in the drawings.

Embodiment One

FIG. 1 is a flowchart of a method for processing commodity transaction according to embodiment one of the present disclosure, and the embodiment may be applied to a case of a commodity transaction through an E-commerce platform. The method may be performed by an apparatus for processing commodity transaction. The apparatus may be implemented by hardware and/or software and be typically integrated into an electronic device.

Combining with FIG. 1, the method provided in the embodiment includes steps described below.

In step S110, a commodity order of a user is acquired from an E-commerce platform.

The user uses a terminal to select a commodity on the E-commerce platform and fill in commodity information of the selected commodity, for example, a type of commodity and a quantity of commodity. In an embodiment, the user may fill in customization information about the commodity, for example, patterns or characters to be printed on a coat. The commodity information and/or customization information filled in by the user will be entered into the database of the E-commerce platform. The E-commerce platform reads out the commodity information and customization information filled in by the user from the database, processes the commodity information and customization information filled in by the user according to an order format, generates the commodity order, and stores the commodity order in the database.

In an embodiment, the terminal may be a mobile terminal or a non-mobile terminal. The non-mobile terminal may be an all-in-one machine, a desktop computer, etc.; and the mobile terminal may be a mobile phone, a laptop computer, a palm computer, etc. The terminal in the embodiment adopts a smart phone belonging to the mobile terminal.

In an embodiment, the commodity order includes order basic information, order delivery information, commodity basic information, commodity specification information, signature information, mapping information and other data. The commodity basic information includes the quantity of commodity and user data, for example, if the ordered commodity is a costume, the user data includes necessary data such as height information, bust, waist and hips (BWH) information, and weight information. The signature information and the mapping information are customization information about the commodity of the user, for example, it is required to print specified characters or patterns at a customized position of the costume, and in another example, quality requirements for the commodity, required fabrics, etc. Certainly, the commodity order may also not include the customization information about the commodity, and the embodiment of the present disclosure is also applicable to a transaction processing of a non-customized commodity.

In step 120, a manufacturing order is generated according to the commodity order and is provided to a manufacturer to enable the manufacturer to produce a commodity on the basis of the manufacturing order.

After the commodity order is generated, in response to a payment operation of the user to the commodity order, the electronic device generates the manufacturing order according to the commodity order, and sends a manufacturer (i.e., a commodity manufacturer) a message for notifying that the production operation can be performed. The payment operation is that the user transfers order amount to an account the E-commerce platform through a payment channel. Then, the E-commerce platform transfers the order amount to the manufacturer account according to the completion status of the order.

The electronic device may send a message for notifying that the production operation can be performed to the manufacturer in a variety of manners, for example, send the message for notifying that the production operation can be performed to a related system of the manufacturer through a Message Queue (MQ) manner or a Remote Procedure Call (RPC) protocol.

It is noteworthy that if the commodity order is generated, but no payment operation is performed by the user, and the commodity order will be temporarily reserved in the database. If the user still has not performed the payment operation when a preset time length is exceeded, the commodity order is subjected to an invalidation processing, for example, an order status of the commodity order is set to "cancelled".

The manufacturing order is a document used for guiding the manufacturer to perform production. The manufacturer may export the manufacturing order from the electronic device, and perform production according to the data in the manufacturing order. Specifically, if the commodity order does not include the customization information about the commodity of the user, the manufacturing order includes the order basic information, the order delivery information, the commodity basic information, the commodity specification information and other data. If the commodity order includes the customization information about the commodity of the user, the manufacturing order further includes the customization information, such as the signature information, the mapping information and other data. According to these data, the manufacturer will determine, according to actual situations, whether to purchase raw materials necessary for the production of the commodity, and whether to perform a deep procedure so as to satisfy the customized requirement of the user.

In step 130, a production progress and/or a delivery progress of the commodity is provided to the user.

In the process of producing the commodity according to the manufacturing order, the production progress and/or the delivery progress of the commodity is provided to the user. In an embodiment, the production progress includes at least one of: to-be-produced, in-production, or produced. The delivery progress includes: undelivered and/or delivered.

The embodiment of the present disclosure substantially provides a customer-to-manufactory (C2M) flexible production mode, in which a commodity order of a user is acquired from an E-commerce platform, and a manufacturing order is generated according to the commodity order and is provided to a manufacturer, therefore a production procedure is added to a procedure for processing commodity transaction, and the manufacturing order is introduced to guide the manufacturer to produce according to the commodity order of the user. When customization information is added to the commodity order, the manufacturer can be guided to produce the commodity satisfying the needs of user according to the customization information; moreover, intermediate links such as distributors and agents are omitted through the C2M mode, which not only reduces cost and enhance satisfaction on user requirements, but also improves the shopping experience of the user; and a production progress and/or a delivery progress of the commodity are provided to the user, and thus a message circulation channel from the manufacturer to the user is opened, the user can know the production progress and/or the delivery progress in real time, which enhances user satisfaction on information acquisition and improves the commodity transaction experience of the user.

Embodiment Two

Figure 2:
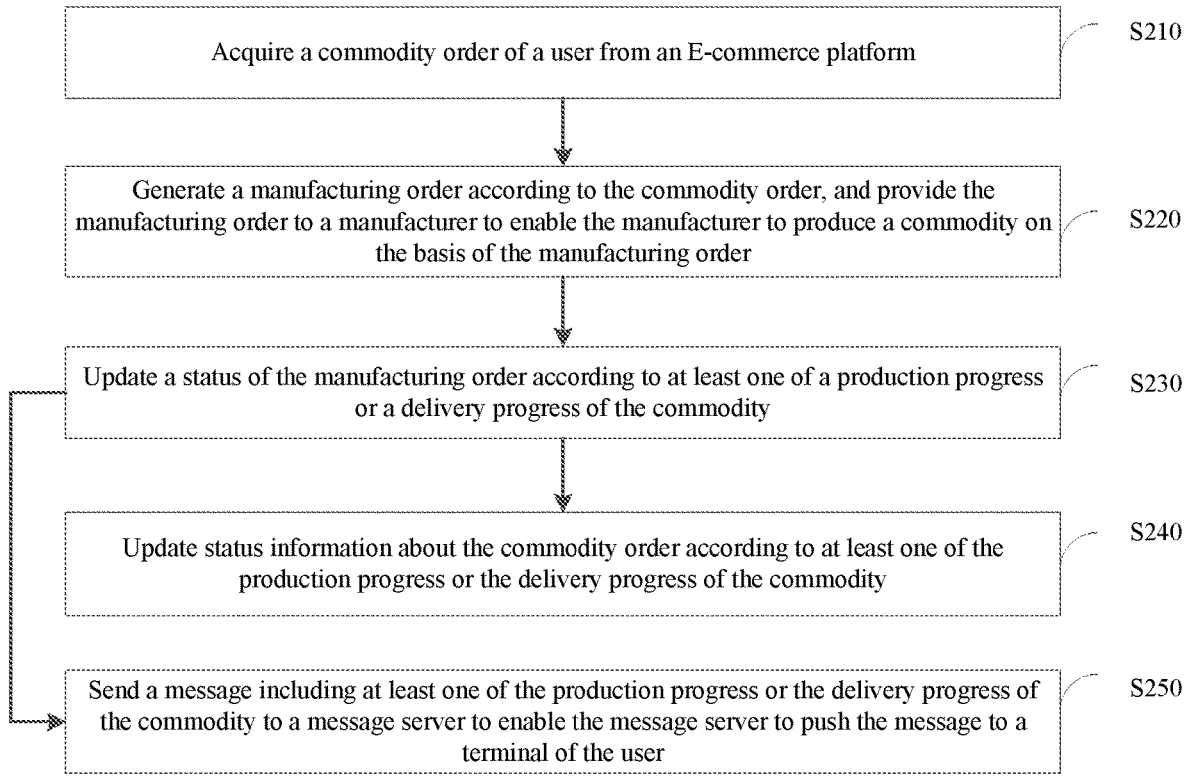
FIG. 2 is a flowchart of a method for processing commodity transaction according to embodiment two of the present disclosure.

FIG. 2 is a flowchart of a method for processing commodity transaction according to embodiment two of the present disclosure. The present embodiment is to further optimize the various embodiments described above. The present embodiment defines a process of updating a status of a manufacturing order and a manner of providing a production progress and/or a delivery progress to a user. In an embodiment, after the manufacturing order is provided to a manufacturer, an operation is added to update the status of the manufacturing order according to the production progress and/or the delivery progress of the commodity; and in an embodiment, "providing the production progress and/or the delivery progress of the commodity to the user" is refined to: updating status information about a commodity order according to the production progress and/or the delivery progress of the commodity; and/or pushing a message to the user, where the message including the production progress and/or the delivery progress of the commodity.

Hereinafter the method provided in the embodiment will be described in detail in conjunction with FIG. 2.

In step S210, a commodity order of the user is acquired from an E-commerce platform.

In step 220, the manufacturing order is generated according to the commodity order and is provided to the manufacturer to enable the manufacturer to produce the commodity on the basis of the manufacturing order.

Firstly, an electronic device initializes the manufacturing order, that is, the manufacturing order is generated according to the commodity order. The status of the manufacturing order during initialization is incomplete. The electronic device periodically filters the manufacturing orders in the incomplete status through a timing service, and a manufacturing order in the incomplete status is updated to completed; then, the manufacturing order in the completed status is updated to to-be-produced.

In step 230, a status of the manufacturing order is updated according to the production progress and/or the delivery progress of the commodity. Step S240 and/or step S250 are followed.

When the status of the manufacturing order is to-be-produced, the manufacturer performs a starting production operation for the commodity, for example, a button for starting production is triggered on an interface provided by the electronic device, and the electronic device updates the status of the manufacturing order to in-production in response to the starting production operation of the manufacturer to the commodity. Specifically, the status of the manufacturing order is updated from to-be-produced to in-production.

After the production is completed, the manufacturer triggers a button for determining delivery on the interface provided by the electronic device, and the electronic device updates the status of the manufacturing order from in-production to produced in response to the delivery operation of manufacturer for the commodity. In an embodiment, after the status of the manufacturing order is updated to produced, the manufacturing order is exported for archiving by the manufacturer.

In step 240, status information about the commodity order is updated according to the production progress and/or the delivery progress of the commodity.

Similar to the step S230, the electronic device updates the status of the commodity order to in-production in response to the starting production operation of the manufacturer for the commodity, and specifically, the status is updated from paid to in-production. The electronic device updates the status of the commodity order from in-production to delivered in response to a delivery operation of the manufacturer for the commodity.

In an embodiment, the electronic device updates status information about the commodity order through the MQ manner. If the status of the commodity order is unsuccessfully updated, and the electronic device updates the status information again through the MQ manner until the status is successfully updated.

In step S250, a message including the production progress and/or the delivery progress of the commodity is sent to a message server to enable the message server to push the message to a terminal of the user.

Similar to the step S230, the electronic device sends a message for starting production to the message server in response to the starting production operation of the manufacturer for the commodity. The electronic device sends a message for indicating delivered to the message server in response to the delivery operation of the manufacturer for the commodity. The message server is configured to push the received message to the terminal of the user.

In an embodiment, the electronic device may send the message to the message server through many manners, for example, may send the message to the message server through the MQ manner or the RPC protocol. In an embodiment, the message server may send a text message, send the message through a third-party platform or send a mail to the terminal of the user.

In the embodiment, the electronic device is used as an entrance of the manufacturer, the production progress and the delivery progress of the commodity are informed through the entrance, and then the state information about the manufacturing order and the state information about the commodity order are updated, such that the process of processing commodity transaction is orderly carried out according to the manufacturing order and the order; the related message pushed to the user enables to quickly and conveniently inform the user of the production progress and the delivery progress, thereby enhancing user satisfaction on information acquisition and improving user experience.

Embodiment Three

Figure 3:
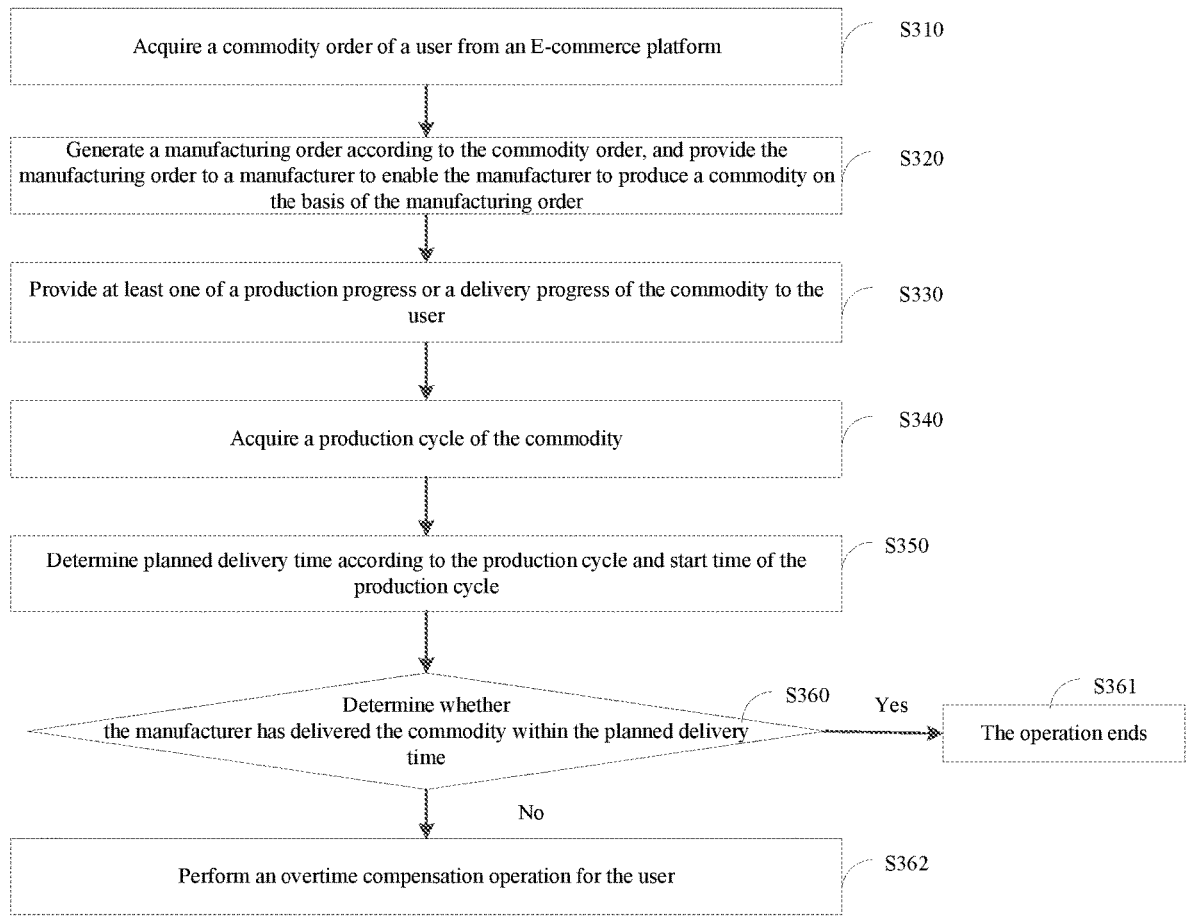
FIG. 3 is a flowchart of a method for processing commodity transaction according to embodiment three of the present disclosure.

The embodiment is to further optimize the implementations of the above-mentioned embodiments, and specifically, an overtime compensation mechanism is added on the basis of the flexible production manner to guarantee rights of the user. FIG. 3 is a flowchart of a method for processing commodity transaction according to embodiment three of the present disclosure. The method includes steps described below.

In step S310, a commodity order of a user is acquired from an E-commerce platform.

In step 320, the manufacturing order is generated according to the commodity order and is provided to the manufacturer to enable the manufacturer to produce the commodity on the basis of the manufacturing order.

In step 330, a production progress and/or a delivery progress of the commodity is provided to the user.

In step S340, a production cycle of the commodity is acquired.

The production cycle is a time cycle set by the manufacturer according to the complexity of the commodity and the turnover of raw materials, and the production cycle is generally measured by day, such as 1 day, 5 days, 15 days. For a customized commodity, the manufacturer increases the time on the basic of the original production cycle according to the customization degree. When the commodity order is generated, the production cycle is determined and displayed in the commodity order.

In step S350, planned delivery time is determined according to the production cycle and start time of the production cycle.

In an embodiment, the start time of the production cycle is determined in any one of the following three manners.

In a first manner, within a preset time length, such as 48 hours, after the commodity order is paid and a message for notifying that a production operation can be performed sent by an electronic device is received, the manufacturer performs a starting production operation for the commodity, for example, a button for starting production on an interface provided by the electronic device is triggered. The start time of the production cycle is determined according to a time point when the manufacturer performs the starting production operation for the commodity. In an embodiment, in the case where the unit of the production cycle is measured by day, the day on which the manufacturer performs the starting production operation for the commodity is taken as the start time, regardless of the exact time of the day.

In a second manner, within the preset time length, such as 48 hours, after the commodity order is paid and the message for notifying that a production operation can be performed sent by the electronic device is received, the manufacturer does not perform the starting production operation for the commodity, while the starting production operation is performed after the preset time period is exceeded. At the moment, the start time of the production cycle is the day including the time point (i.e. an overdue time point) when the preset time length expires.

In particular, the status of the commodity order is not updated at the start time of the production cycle, i.e., the status of the order is still paid. The state of the order is only synchronously updated to be in-production if the manufacturer performs the starting production operation for the commodity.

In a third manner, within the preset time length, such as 48 hours, after the commodity order is paid and the message for notifying that a production operation can be performed sent by the electronic device is received, the manufacturer does not perform the starting production operation for the commodity, while the starting production operation is performed after the preset time period is exceeded. At the moment, the start time of the production cycle is the day including the time point (i.e. an overdue time point) when the preset time length expires. The third manner is different from the second manner in that the status of the order is updated from paid to in-production at the start time of the production cycle.

The end time of the production cycle, i.e., planned delivery time, is time after the production cycle from the start time of the production cycle.

The manufacturer performs the starting production operation for the commodity, for example, the button for starting production is triggered on the interface provided by the electronic device, and the electronic device notifies the user of the planned delivery time in response to the starting production operation of the manufacturer for the commodity.

In step S360, it is determined whether the manufacturer delivers the commodity within the planned delivery time; if yes, go to S361; if not, go to S362.

After the production, the manufacturer triggers a button for determining delivery on the interface provided by the electronic device, and the electronic device pushes a message for indicating delivered to the terminal of the user in response to the delivery operation of manufacturer for the commodity, such that the user can learn actual delivery time.

If the message for indicating delivered is received within the planned delivery time, or the actual delivery time is later than the planned delivery time, and it is determined that the manufacturer does not perform delivery within the planned delivery time, an overtime compensation operation is performed for the user; if the message for indicating delivered is received within the planned delivery time, it is determined that the manufacturer has performed the delivery within the planned delivery time.

In step S361, the operation ends.

In step S362, the overtime compensation operation is performed for the user.

In an embodiment, the electronic device actively performs the overtime compensation operation for the user. Specifically, a charge document is automatically created, and order information is filled in the charge document. Then, a charge type of the charge document is set as overtime compensation, and a compensation amount is automatically calculated. The compensation amount may be a fixed amount or an adjustable amount; in an embodiment, the compensation amount does not exceed a preset percentage, e.g., 30%, of the order amount. Finally, the compensation amount is transferred to an account of the user.

In another embodiment, the electronic device performs the overtime compensation operation for the user in response to an overtime compensation request of the user. The user may log into an E-commerce platform or call customer service to make the overtime compensation request. After the electronic device checks user information, the charge document is automatically created, and the order information is filled in the charge document. Then, the charge type of the charge document is set as the overtime compensation, and the compensation amount matched with the order amount is automatically calculated. Finally, the compensation amount is transferred to the account of the user.

The embodiment adds the overtime compensation mechanism on the basis of the flexible production method, which improves the shopping experience of the user.

Embodiment Four

Figure 4:
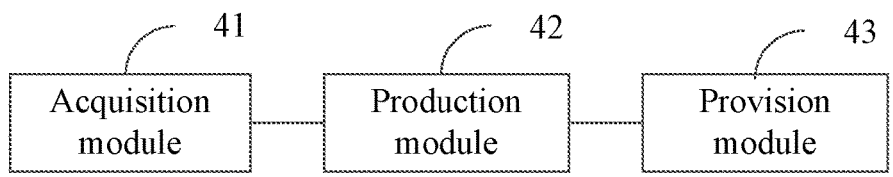
FIG. 4 is a schematic structural diagram of an apparatus for processing commodity transaction according to embodiment four of the present disclosure.

FIG. 4 is a schematic structural diagram of an apparatus for processing commodity transaction according to embodiment four of the present disclosure. The embodiment may be applied to the case of commodity transaction through an E-commerce platform. Combining with FIG. 4, an apparatus provided in the embodiment includes an acquisition module 41, a production module 42 and a provision module 43.

The acquisition module 41 is configured to acquire a commodity order of a user from the E-commerce platform.

The production module 42 is configured to generate a manufacturing order according to the commodity order, and provide to a manufacturer to enable the manufacturer to produce a commodity on the basis of the manufacturing order.

The provision module 43 is configured to provide a production progress and/or a delivery progress of the commodity to the user.

The embodiment of the present disclosure substantially provides a customer-to-manufactory (C2M) flexible production mode, in which a commodity order of a user is acquired from an E-commerce platform, and a manufacturing order is generated according to the commodity order and is provided to a manufacturer, therefore a production procedure is added to a procedure for processing commodity transaction, and the manufacturing order is introduced to guide the manufacturer to produce according to the commodity order of the user. When customization information is added to the commodity order, the manufacturer can be guided to produce the commodity satisfying the needs of user according to the customization information; moreover, intermediate links such as distributors and agents are omitted through the C2M mode, which not only reduces cost and enhance satisfaction on user requirements, but also improves the shopping experience of the user; and a production progress and/or a delivery progress of the commodity are provided to the user, and thus a message circulation channel from the manufacturer to the user is opened, the user can know the production progress and/or the delivery progress in real time, which enhances user satisfaction on information acquisition and improves the commodity transaction experience of the user.

In an embodiment, the commodity order includes customization information about the commodity of the user. Accordingly, when generating the manufacturing order according to the commodity order and providing the manufacturing order to the manufacturer to enable the manufacturer to produce the commodity on the basis of the manufacturing order, the production module 42 is specifically configured to: generate a manufacturing order including the customization information according to the commodity order to enable the manufacturer to produce a customized commodity on the basis of the manufacturing order.

In an embodiment, the apparatus further includes an updating module. The updating module is configured to, after the manufacturing order is provided to the manufacturer, update a status of the manufacturing order according to the production progress and/or the delivery progress of the commodity.

In an embodiment, when updating the status of the manufacturing order according to the production progress and/or the delivery progress of the commodity, the updating module is specifically configured to: update the status of the manufacturing order to in-production in response to a starting production operation of the manufacturer for the commodity, and update the status of the manufacturing order from in-production to produced in response to a delivery operation of the manufacturer for the commodity.

In an embodiment, when providing the production progress and/or the delivery progress of the commodity, the provision module 43 is specifically configured to: update status information about the commodity order according to the production progress and/or the delivery progress of the commodity; and/or send a message including the production progress and/or the delivery progress of the commodity to a message server to enable the message server to push the message to a terminal of the user.

In an embodiment, when updating the status information about the commodity order according to the production progress and/or the delivery progress of the commodity, the provision module 43 is specifically configured to: update the status of the commodity order to in-production in response to the starting production operation of the manufacturer for the commodity, and/or update the status of the commodity order from in-production to delivered in response to a delivery operation of the manufacturer for the commodity.

The apparatus for processing commodity transaction provided in the embodiment of the present disclosure can execute the method for processing commodity transaction according to any embodiment of the present disclosure, and has corresponding functional modules and beneficial effects of the method.

Embodiment Five

Figure 5:
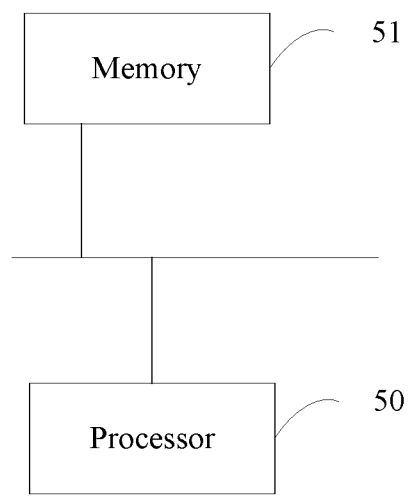
FIG. 5 is a schematic structural diagram of an electronic device according to embodiment five of the present disclosure.

FIG. 5 is a structural diagram of an electronic device according to an embodiment five of the present disclosure. As shown in FIG. 5, the electronic device includes a processor 50 and a memory 51. The number of processors 50 in the electronic device may be one or more, and one processor is used as an example in FIG. 5. The processor 50 and the memory 51 in the electronic device may be connected through a bus or in other ways. In FIG. 5, the connection through the bus is used as an example.

The memory 51 as a computer-readable storage medium may be used for storing software programs, computer executable programs and modules, for example, program instructions/modules corresponding to the method for processing commodity transaction in the embodiment of the present disclosure (for example, the acquisition module 41, the production module 42 and the provision module 43 in the apparatus for processing commodity transaction). The processor 50 executes various function applications and data processing of the apparatus, that is, implements the above-mentioned method for processing commodity transaction, by executing software programs, instructions and modules stored in the memory 51.

The memory 51 may mainly include a program storage area and a data storage area. The program storage area may store an operating system, at least one application required for functions. The data storage area may store data and the like created according to the use of the terminal. Furthermore, the memory 51 may include a high speed random access memory, and may also include a nonvolatile memory such as at least one disk memory, flash memory or another nonvolatile solid state memory. In some examples, the memory 51 may further include memories located remotely relative to the processor 50 and these remote memories may be connected to the electronic device via networks. Examples of the above network include, but are not limited to, the Internet, an intranet, a local area network, a mobile communication network and a combination thereof.

Embodiment Six

Figure 6:
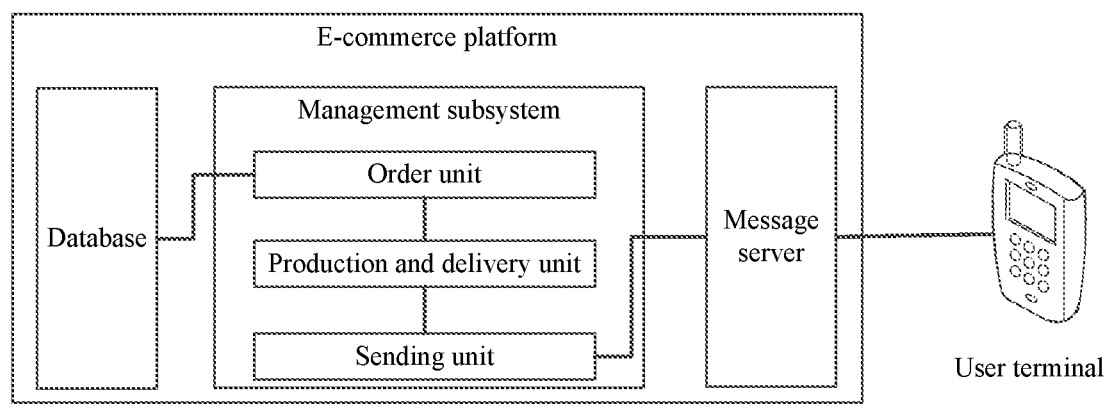
FIG. 6 is a schematic structural diagram of a system for processing commodity transaction according to embodiment six of the present disclosure.

FIG. 6 is a schematic structural diagram of a system for processing commodity transaction according to embodiment six of the present disclosure. Combining with FIG. 6, a system for processing commodity transaction includes a management subsystem and a message server, where the management subsystem includes an order unit, a production and delivery unit, and a sending unit, which are applied to the electronic device in the above-mentioned embodiment. The system for processing commodity transaction may be integrated into the E-commerce platform, or may be independent of the E-commerce platform and interact with the E-commerce platform. The system for processing commodity transaction shown in FIG. 6 is integrated into the E-commerce platform. In addition, the E-commerce platform interacts with the terminal of the user, which is mainly used for exhibiting commodities, and provides technical support related to the commodity transaction for the users.

The management subsystem is configured to user the order unit to acquire a commodity order of a user from an E-commerce platform; user the production and delivery unit to generate a manufacturing order according to the commodity order and provide the manufacturing order to a manufacturer to enable the manufacturer to produce a commodity on the basis of the manufacturing order; and use the sending unit to send a message including a production progress and/or a delivery progress of the commodity to the message server. The message server is configured to push the message to a terminal of the user.

The order unit acquires the commodity order from a database of the E-commerce platform. Then, in response to a payment operation of the user to the commodity order, the data of the commodity order is synchronized to the production and delivery unit, and the production and delivery unit is notified to generate the manufacturing order according to the commodity order. In an embodiment, the notification manner includes, but is not limited to the MQ manner or the RPC protocol.

In an embodiment, the management subsystem uses RPC protocol through the sending unit to call a service interface (dubbo interface) provided by the message server to send the message.

In an embodiment, the management subsystem is further configured to, after the manufacturing order is provided to the manufacturer through the production and delivery unit, update the status of the manufacturing order according to the production progress and/or the delivery progress of the commodity. In an embodiment, updating the status of the manufacturing order according to the production progress and/or the delivery progress of the commodity includes updating the status of the manufacturing order to in-production in response to a starting production operation of the manufacturer for the commodity, and updating the status of the manufacturing order from in-production to produced in response to a delivery operation of the manufacturer for the commodity.

In an embodiment, the management subsystem is further configured to use the order unit to update the status of the commodity according to the production progress and/or the delivery progress of the commodity. In an embodiment, updating status information about the commodity order according to the production progress and/or the delivery progress of the commodity includes updating the status of the commodity order to in-production in response to the starting production operation of the manufacturer for the commodity, and/or updating the status of the commodity order from in-production to delivered in response to the delivery operation of the manufacturer for the commodity.

In an embodiment, the management subsystem further includes an overtime compensation unit. The overtime compensation unit is configured to, after a message including the production progress and/or the delivery progress of the commodity is sent to a message server through the sending unit, and/or after the status information about of the commodity order is updated through the order unit according to the production progress and/or the delivery progress of the commodity, acquire a production cycle of the commodity; and determine the planned delivery time according to the production cycle and start time of the production cycle; if the manufacturer does not deliver the commodity within the planned delivery time, the overtime compensation operation is performed for the user.

It is noteworthy that the management subsystem further includes a commodity management unit, a logistics management unit, a financial management unit, etc. The commodity management unit is used for displaying, selling and returning commodities. The logistics management unit is used for configuring the commodity to a logistics company for logistics and monitoring logistics nodes. The financial management unit is used for receiving and checking order amount of the user, transfer accounts to the logistics company and transfer accounts to the manufacturer.

The system for processing commodity transaction provided in the embodiment of the present disclosure may execute the method for processing commodity transaction according to any embodiment of the present disclosure, and has corresponding functional modules and beneficial effects of the method.

Embodiment Seven

The embodiment seven of the present disclosure further provides a computer-readable storage medium configured to store computer programs. When executed by a computer processor, the computer programs are configured to execute a method for processing commodity transaction. The method includes steps described below.

A commodity order of a user is acquired from an E-commerce platform.

A manufacturing order is generated according to the commodity order, and is provided to a manufacturer to enable the manufacturer to produce a commodity on the basis of the manufacturing order.

A production progress and/or a delivery progress of the commodity are provided to the user.

In the computer-readable storage medium storing computer programs provided by the embodiment of the present disclosure, the computer programs execute not only the above method operations but also related operations in the method for processing commodity transaction provided by any embodiment of the present disclosure.

From the above description of embodiments, it will be apparent to those skilled in the art that the present disclosure may be implemented by means of software and necessary general-purpose hardware, or may of course be implemented by hardware, but in many cases the former is more often used. Based on this understanding, the present disclosure substantially, or the part contributing to the related art, may be embodied in the form of a software product. The software product is stored in a computer readable storage medium, such as a computer floppy disk, a read-only memory (ROM), a random access memory (RAM), a flash, a hard disk or an optical disk, and includes several instructions for enabling a computer device (which may be a personal computer, a server or a network device) to execute the method according to each embodiment of the present disclosure.

It is to be noted that units and modules involved in the embodiment of the above-mentioned apparatus for processing commodity transaction are just divided according to functional logic, and the division is not limited to this, as long as the corresponding functions can be realized. In addition, the specific names of the each functional unit are just intended for distinguishing, and are not to limit the protection scope of the present disclosure.

It is to be noted that the above are merely some embodiments of the present disclosure and the technical principles used therein. It will be understood by those skilled in the art that the present disclosure is not limited to the specific embodiments described herein. Those skilled in the art can make various apparent modifications, adaptations and substitutions without departing from the scope of the present disclosure. Therefore, while the present disclosure has been described in detail through the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A method for processing commodity transaction, comprising:
   acquiring, by an electronic device, a commodity order of a user client from an E-commerce platform;
   generating, by the electronic device, a manufacturing order according to the commodity order, and providing the manufacturing order to a manufacturer to enable the manufacturer to produce a commodity on the basis of the manufacturing order;
   updating, by the electronic device, a status of the manufacturing order according to at least one of a production progress or a delivery progress of the commodity, wherein the updating a status of the manufacturing order comprises: after a button for starting production is triggered on an interface provided by the electronic device, updating, by the electronic device the status of the manufacturing order to in-production in response to a starting production operation of the manufacturer for the commodity, and updating the status of the manufacturing order from the in-production to been-produced in response to the manufacturer performing a delivery operation for the commodity;
   providing, by the electronic device, at least one of the production progress or the delivery progress of the commodity to the user client, wherein providing at least one of the production progress or the delivery progress of the commodity to the user client comprises: sending, by the electronic device, a message comprising at least one of the production progress or the delivery progress of the commodity to a message server through a Message Queue, MQ, manner or a Remote Procedure Call, RPC, protocol to enable the message server to push the message to the user client, wherein the message server sends a text message, sends a message through a third-party platform or sends a mail to the user client; and
   in a case where a production cycle of the commodity, the production progress of the commodity and the delivery progress of the commodity indicates that the commodity will not be delivered in time, automatically creating, by the electronic device, a charge document with a charge type as overtime compensation, and automatically calculating compensation amount.

2. The method of claim 1, wherein the commodity order comprises customization information about the commodity of the user client;
   wherein generating the manufacturing order according to the commodity order and providing the manufacturing order to the manufacturer to enable the manufacturer to produce the commodity on the basis of the manufacturing order comprises:
   generating a manufacturing order comprising the customization information according to the commodity order to enable the manufacturer to produce a customized commodity on the basis of the manufacturing order.

3. The method of claim 1, wherein providing at least one of the production progress or the delivery progress of the commodity to the user client comprises at least one of:
   updating status information about the commodity order according to at least one of the production progress or the delivery progress of the commodity, and providing the updated status information about the commodity order to the user client; or
   sending a message comprising at least one of the production progress or the delivery progress of the commodity to a message server to enable the message server to push the message to a terminal of the user client.

4. The method of claim 3, wherein updating the status information about the commodity order according to at least one of the production progress or the delivery progress of the commodity comprises at least one of:
   in response to the manufacturer performing a starting production operation for the commodity, updating a status of the commodity order to in-production; or
   in response to the manufacturer performing a delivery operation for the commodity, updating the status of the commodity order from in-production to delivered.

5. A non-transitory computer-readable storage medium, storing computer programs thereon, the programs, when executed by a processor, cause the processor to implement the method of claim 1.

6. An apparatus for processing commodity transaction, comprising:
   at least one processor; and
   a memory for storing instructions,
   wherein the instructions, when executed by the at least one processor, cause the at least one processor to perform following steps:
   acquiring a commodity order of a user client from an E-commerce platform;
   generating a manufacturing order according to the commodity order, and providing the manufacturing order to a manufacturer to enable the manufacturer to produce a commodity on the basis of the manufacturing order;
   updating a status of the manufacturing order according to at least one of a production progress or a delivery progress of the commodity, wherein the updating a status of the manufacturing order comprises: after a button for starting production is triggered on an interface provided by an electronic device, updating, by the electronic device, the status of the manufacturing order to in-production in response to a starting production operation of the manufacturer for the commodity, and updating the status of the manufacturing order from the in-production to been-produced in response to the manufacturer performing a delivery operation for the commodity;
   providing at least one of the production progress or the delivery progress of the commodity to the user client, wherein providing at least one of the production progress or the delivery progress of the commodity to the user client comprises: sending, by the electronic device, a message comprising at least one of the production progress or the delivery progress of the commodity to a message server through a Message Queue, MQ, manner or a Remote Procedure Call, RPC, protocol to enable the message server to push the message to the user client; wherein the message server sends a text message, sends a message through a third-party platform or sends a mail to the user client; and
   in a case where a production cycle of the commodity, the production progress of the commodity and the delivery progress of the commodity indicates that the commodity will not be delivered in time, automatically creating, by the electronic device, a charge document with a charge type as overtime compensation, and automatically calculating compensation amount.

7. The apparatus of claim 6, wherein the commodity order comprises customization information about the commodity of the user client;
wherein the step of generating the manufacturing order according to the commodity order and providing the manufacturing order to the manufacturer to enable the manufacturer to produce the commodity on the basis of the manufacturing order comprises:
generating a manufacturing order comprising the customization information according to the commodity order to enable the manufacturer to produce a customized commodity on the basis of the manufacturing order.

8. The apparatus of claim 6, wherein the step of providing at least one of the production progress or the delivery progress of the commodity to the user client comprises at least one of:
updating status information about the commodity order according to at least one of the production progress or the delivery progress of the commodity, and providing the updated status information about the commodity order to the user client; or
sending a message comprising at least one of the production progress or the delivery progress of the commodity to a message server to enable the message server to push the message to the user client.

9. The apparatus of claim 8, wherein the step of updating the status information about the commodity order according to at least one of the production progress or the delivery progress of the commodity comprises at least one of:
in response to the manufacturer performing a starting production operation for the commodity, updating a status of the commodity order to in-production; or
in response to the manufacturer performing a delivery operation for the commodity, updating the status of the commodity order from in-production to delivered.

10. A system for processing commodity transaction, comprising: a management subsystem and a message server, wherein the management subsystem comprises an order unit, a production and delivery unit and a sending unit;
wherein the management subsystem is configured to use the order unit to acquire a commodity order of a user client from an E-commerce platform; use the production and delivery unit to generate a manufacturing order according to the commodity order and provide the manufacturing order to a manufacturer to enable the manufacturer to produce a commodity on the basis of the manufacturing order; update a status of the manufacturing order according to at least one of a production progress or a delivery progress of the commodity, wherein the update a status of the manufacturing order comprises: the management subsystem updates the status of the manufacturing order to in-production in response to a starting production operation of the manufacturer for the commodity, and the management subsystem updates the status of the manufacturing order from the in-production to been-produced in response to the manufacturer performing a delivery operation for the commodity; and
and use the sending unit to send a message comprising at least one of a production progress or a delivery progress of the commodity through a Message Queue, MQ, manner or a Remote Procedure Call, RPC, protocol to the message server; and
the message server is configured to push the message to the user client, wherein the message server sends a text message, sends a message through a third-party platform or sends a mail to the user client; and
in a case where a production cycle of the commodity, the production progress of the commodity and the delivery progress of the commodity indicates that the commodity will not be delivered in time, the management subsystem is configured to automatically create a charge document with a charge type as overtime compensation and automatically calculate compensation amount.

* * * * *